United States Patent [19]
Larsson

[11] Patent Number: 6,088,389
[45] Date of Patent: *Jul. 11, 2000

[54] SYSTEM AND METHOD FOR TRAINING A PLURALITY OF EQUALIZERS AND A MODEM EMPLOYING THE SYSTEM OR METHOD

[75] Inventor: Patrik Larsson, Matawan, N.J.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/855,086

[22] Filed: May 13, 1997

[51] Int. Cl.[7] .............................. H03H 7/30; H03H 7/40; H03K 5/159
[52] U.S. Cl. ............................................. 375/231; 375/232
[58] Field of Search ..................................... 375/229, 231, 375/222, 219, 260, 259, 261, 285, 235, 232, 346, 348, 349

[56] References Cited

U.S. PATENT DOCUMENTS

| | | |
|---|---|---|
| 4,430,743 | 2/1984 | Watanabe . |
| 4,709,374 | 11/1987 | Farrow ..................................... 375/231 |
| 5,084,902 | 1/1992 | Aotani et al. .............................. 375/13 |
| 5,245,611 | 9/1993 | Ling et al. . |
| 5,297,165 | 3/1994 | Ueda et al. ................................. 375/12 |
| 5,311,546 | 5/1994 | Paik et al. ................................. 375/14 |
| 5,386,239 | 1/1995 | Wang et al. ............................. 348/472 |
| 5,418,817 | 5/1995 | Richter ..................................... 375/231 |
| 5,495,203 | 2/1996 | Harp et al. ................................ 329/306 |
| 5,506,871 | 4/1996 | Hwang et al. ............................ 375/230 |
| 5,598,434 | 1/1997 | Kaku et al. ............................... 375/229 |
| 5,602,602 | 2/1997 | Hulyalkar ................................. 348/607 |
| 5,610,948 | 3/1997 | Ninomiya et al. ...................... 375/324 |
| 5,694,423 | 12/1997 | Larsson et al. .......................... 375/231 |
| 5,710,792 | 1/1998 | Fukawa et al. .......................... 375/229 |
| 5,805,637 | 9/1998 | Hirosaka et al. ........................ 375/229 |
| 5,881,110 | 3/1999 | Cochran .................................. 375/324 |
| 5,886,748 | 3/1999 | Lee ......................................... 348/614 |

Primary Examiner—Chi H. Pham
Assistant Examiner—Jean B Corrielus

[57] ABSTRACT

A system and method for training a plurality of equalizers to recognize a plurality of symbols in a received signal, the plurality of equalizers deriving intermediate symbols from the received signal as a function of at least one filter coefficient, the system including 1) a phase detection circuit that determines a phase error between at least one intermediate symbol and at least one symbol in a predetermined constellation of symbols, and 2) a coefficient modification circuit that modifies at least one filter coefficient of the plurality of equalizers as a function of the phase error to cause the at least one intermediate symbol to converge toward a symbol in the predetermined constellation of symbols as the phase error approaches zero, the intermediate symbols being substantially equal to the predetermined constellation of symbols when the phase error is equal to zero. The system or method may be employed in a modulator/demodulator (MODEM) to enhance the communication of digital data through an analog transmission medium.

29 Claims, 7 Drawing Sheets

SYSTEM AND METHOD FOR TRAINING A PLURALITY OF EQUALIZERS AND A MODEM EMPLOYING THE SYSTEM OR METHOD

TECHNICAL FIELD OF THE INVENTION

The present invention is directed, in general, to data communications and, more specifically, to a system and method for training a plurality of equalizers to recognize a plurality of symbols in a received signal, and a modulator/demodulator ("modem") employing the system or the method.

BACKGROUND

Equalization is the process of reducing the effects of distortion over signal transmission paths by compensating for the signal path distortion at either or both ends of the transmission medium. A training sequence may be employed to adapt an equalizer to compensate for the signal path distortion, which may alter the amplitude and/or phase of a signal.

For phase- and amplitude-modulated transmission schemes, the phase and amplitude of a signal are selectively shifted to combinations of values, each combination representing a different set of transmitted bits, commonly referred to as "symbols." At a receiver, proper decoding of the transmitted symbols requires detection of the various combinations of phase and amplitude. For two-dimensional modulation schemes, the signal is represented mathematically by an in-phase ("I") component and a quadrature-phase ("Q") component, which are separated by a phase difference of $\pi/2$. A two-dimensional plot of the I and Q components for a complete set of received symbols produces a pattern referred to as a constellation.

Because of signal path distortion, the proper detection of the I and Q components of a signal can be difficult to obtain. One source of interference is intersymbol interference which results when consecutively-transmitted symbols interfere with one another. To compensate for intersymbol interference ("ISI"), especially in bandwidth-efficient communication receivers that operate with a data rate close to the channel capacity, an equalizer that uses a fractionally-spaced adaptive filter may be used, as described in S. U. H. Qureshi, "Adaptive Equalization," *Proceedings of IEEE,* v.73, No. 9, pp. 1349–87 (1985), which is incorporated by reference as if fully set forth herein. An adaptive filter can modify the filter coefficients, or "tap weights," used by the filter to remove ISI. Updating of the filter coefficients is done to minimize an error at the output of the filter, which is effectively a measure of the difference between the actual output of the filter and the expected output. The adaptive process continues until the error signal is at a minimum, which indicates that the filter has "converged." The convergence of an equalizer depends on many factors, e.g., the initial filter coefficients, signal-to-noise ("SNR") ratio, and phase changes caused by clock recovery at the receiver, but can be accomplished using various adaptive algorithms, such as the conventional Least Mean Square ("LMS"), Reduced Constellation Algorithm ("RCA"), or the Constant Modulus Algorithm ("CMA"). RCA is described by Benveniste and Goursat in "Blind Equalizers," IEEE T. Comm., v. 32, no. 8, pp. 871–883, August 1984, and CMA is described by Godard in "Self-Recovering Equalization and Carrier Tracking in Two-Dimensional Data Communication Systems," IEEE T. Comm., v. 28, no. 11, pp. 1867–1875, November 1980, both of which are incorporated herein by reference, as if reproduced in their entirety.

The adaptation of the filter coefficients in an adaptive equalizer is based on an assumption that a correct decision is made regarding which symbol is received at a given time. The assumption is valid for equalizers using a training sequence for which the identity of each received signal is known a priori. Some equalizers, however, are also used without the benefit of a training sequence, in which case the assumption is not necessarily correct; such equalizers are commonly referred to as "blind" equalizers, implying a possibility that the filter coefficients may be erroneously updated. Although the possibility of a mistake exists, if a blind equalizer makes correct decisions for a sufficiently-large set of received symbols, the equalizer will converge.

Fractionally-spaced equalizers are generally insensitive to sampling phase; the basic reason for insensitivity due to the capability of fractionally-spaced equalizers to introduce an arbitrary delay, or "phase shift," from the input to the output. For some schemes, a rotator/derotator may be used to correct for this phase shift. The use of a rotator/derotator, however, adds additional complexity and cost to a device. Therefore, there is a need in the art for an equalization scheme that does not require the use of a rotator/derotator to correct for phase shift, or phase "error," in devices employing fractionally-spaced adaptive equalizers.

SUMMARY OF THE INVENTION

A system and method for training a plurality of equalizers to recognize a plurality of symbols in a received signal, the plurality of equalizers deriving intermediate symbols from the received signal as a function of at least one filter coefficient, the system including 1) a phase detection circuit that determines a phase error between at least one intermediate symbol and at least one symbol in a predetermined constellation of symbols, and 2) a coefficient modification circuit that modifies at least one filter coefficient of the plurality of equalizers as a function of the phase error to cause the at least one intermediate symbol to converge toward a symbol in the predetermined constellation of symbols as the phase error approaches zero, the intermediate symbols being substantially equal to the predetermined constellation of symbols when the phase error is equal to zero. The system or method may be employed in a modulator/demodulator (MODEM) to enhance the communication of digital data through an analog transmission medium.

The present invention therefore introduces the broad concept of modifying one or more filter coefficients of an equalizer to correct for phase error between the symbols derived by the equalizer and a predetermined constellation of symbols. In contrast to the prior art, a communications device employing the invention does not require the use of a rotator or derotator to correct for phase error, thereby simplifying the cost and complexity of the device. In one embodiment, a modem advantageously employs the invention to improve the accuracy of received data communicated from a remote device.

In one embodiment, the phase detection circuit averages the phase error of a plurality of intermediate symbols to determine the phase error, the plurality of intermediate symbols converging to a like plurality of symbols in a predetermined constellation of symbols as the phase error approaches zero. The coefficient modification circuit may modify the filter coefficients of the equalizer only after the receipt of a plurality of symbols or may update the filter coefficients for every symbol using a running phase error equal to the average phase error of a plurality of immediately preceding symbols. Alternatively, the phase detection circuit may compute a phase error for each intermediate symbol and the coefficient modification circuit may modify the filter coefficients of the equalizer for each intermediate symbol. In one embodiment, the phase detection circuit determines the phase error by calculating a difference between relative sizes of first and second portions of a total region occupied by all of the intermediate symbols, the relative sizes of the first and second portions being equal when the phase error is equal to zero. The principles of the present invention, however, are not limited to a particular method of determining a phase error or a rate at which the filter coefficients are updated; the present invention broadly discloses a system and method for correcting for phase error, without requiring a rotator or derotator, by modifying the filter coefficients of an equalizer.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

The following detailed description relates to a system and method for training a plurality of equalizers to recognize a plurality of symbols in a received signal. In one embodiment, the system and method are employed by a modulator/demodulator ("modem") for communicating with a remote device via an analog transmission medium. The following description of the invention assumes a two-dimensional ("2D") orthogonal modulation scheme; those skilled in the art, however, will recognize that the principles discribed herein may be applied to systems employing an N-dimensional modulation scheme.

For phase-splitting blind equalizers, the Constant Modulus Algorithm ("CMA") has shown superior convergence reliability over Reduced Constellation Algorithm ("RCA") because the use of RCA occasionally leads to ill-convergence when trapped in a local minimum. The use of CMA, however, has traditionally required a rotator/derotator, for example, when switching to a Least Mean Square ("LMS") algorithm for improved steady-state performance. The present invention discloses a system and method that directly affects the equalizer filter coefficients whereby the need for a rotator/derotator is eliminated. Although described hereinafter with specific reference to the CMA equalization algorithm, the principles disclosed herein may be used with various other equalization algorithms that may require phase correction of the constellation during convergence, including, without limitation, Carrierless AM/PM ("CAP").

Figure 1:
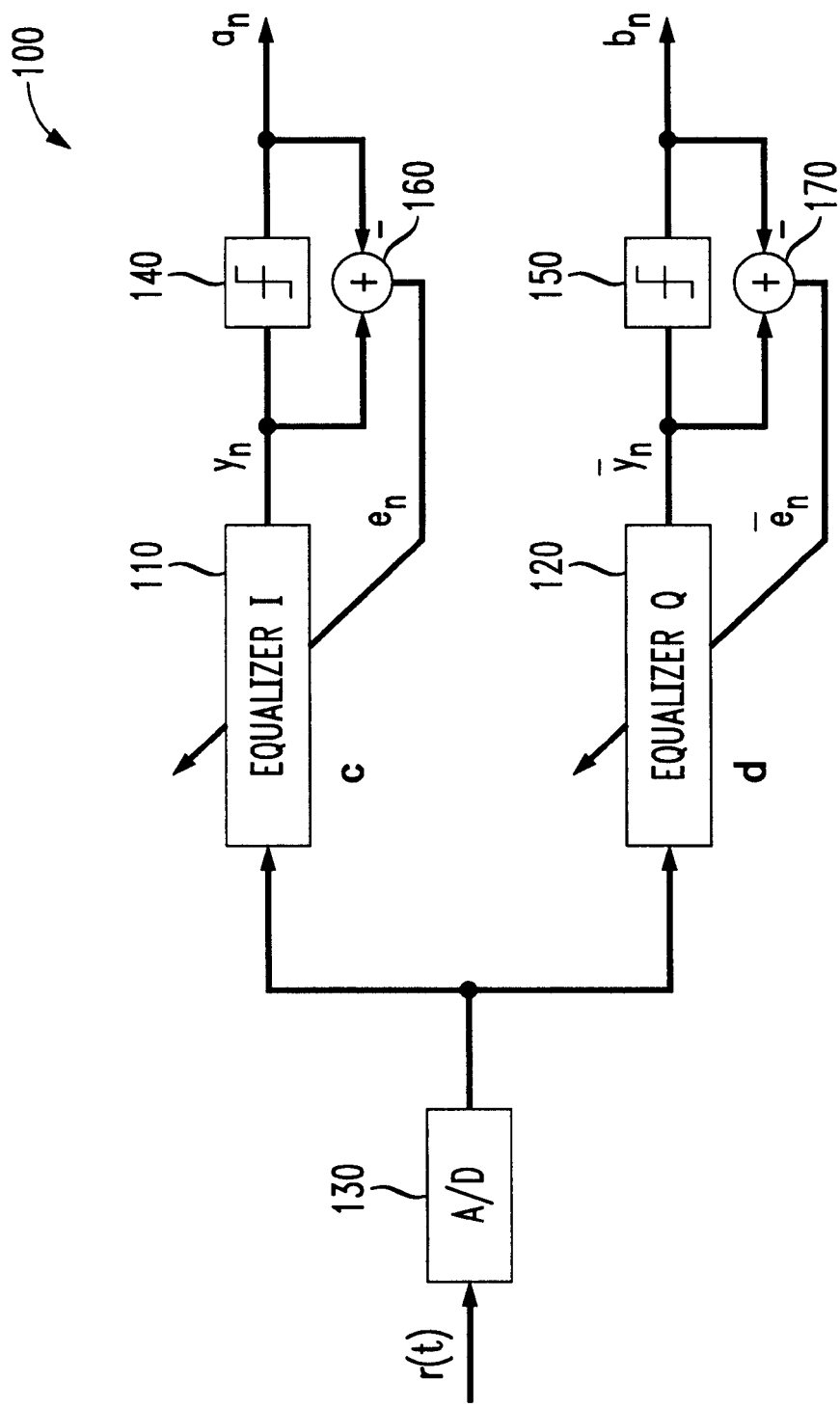
FIG. 1 illustrates a functional depiction of a two-dimensional phase-splitting equalizer scheme, employing a conventional Least Mean Square ("LMS") equalization algorithm.

Referring initially to FIG. 1, illustrated is a functional depiction of a two-dimensional phase-splitting equalizer scheme 100, employing a conventional Least Mean Square ("LMS") equalization algorithm, which is suitable to introduce the terminology used hereinafter. The equalizer includes an in-phase ("I") equalizer 110 and a quadrature-phase ("Q") equalizer 120. A received signal r(t) is input to the I and Q equalizers 110, 120, respectively, following conversion by an analog-to-digital converter 130. The LMS training algorithm is implemented with slicers 140, 150 and adders 160, 170. Those skilled in the art are familiar with the use of "slicers," "adders," "multipliers," and other similar circuits, or their equivalents (e.g., processes embodied in executable software code), to implement LMS, as well as other equalization algorithms, based solely on a mathematical expression; thus, specific illustrations and descriptions of systems or methods of implementing particular algorithms is unnecessary to the disclosure herein, whereas such is within the knowledge of those skilled in the art. As used herein, a symbol at the output of an equalizer (e.g., $y_n$) is defined as an "intermediate" symbol, and a symbol at the output of a slicer (e.g., $a_n$) is defined as a "resulting" symbol, a training sequence being used to cause an equalizer to generate a set of intermediate symbols, from a received signal r(t), such that the resulting symbols converge to a predetermined constellation of symbols. The training sequence corrects for a phase error of the intermediate symbols, whereby an equalizer is trained to properly recognize the presence of symbols in the predetermined constellation of symbols that are encoded in the received signal r(t).

The tap weight vectors (i.e., filter coefficients) for the I and Q equalizers 110, 120 are denoted by c and d, respectively, and the tap updating is generally described by:

$$c_{n+1} = c_n - \alpha \cdot e_n \cdot r_n$$

$$d_{n+1} = d_n - \alpha \cdot \bar{e}_n \cdot r_n \quad (1)$$

where $\alpha$ is a small, positive constant, often referred to as the "stepsize," and $e_n$ and $\bar{e}_n$ are defined as follows for various equalization algorithms:

$$LMS: \begin{array}{c} e_n = y_n - a_n \\ \overline{e}_n = \overline{y}_n - b_n \end{array} \quad (2)$$

$$RCA: \begin{array}{c} e_n = y_n - R_{rca} \cdot \text{sgn}(y_n) \\ \overline{e} = \overline{y}_n - R_{rca} \cdot \text{sgn}(\overline{y}_n) \end{array} \quad (3)$$

$$CMA: \begin{array}{c} e_n = (y_n^2 + \overline{y}_n^2 - R_{cma}^2) \cdot y_n \\ \overline{e}_n = (y_n^2 + \overline{y}_n^2 - R_{cma}^2) \cdot \overline{y}_n \end{array} \quad (4)$$

where $R_{rca}$ and $R_{cma}$ are positive constants having values that depend on the size of the constellation of symbols.

Figure 2A:
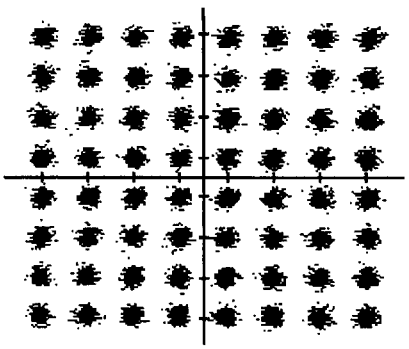
FIGS. 2-A, 2-B and 2-C illustrate a 64-point symbol constellation after convergence using RCA, LMS, and CMA equalization algorithms, respectively.
Figure 2B:
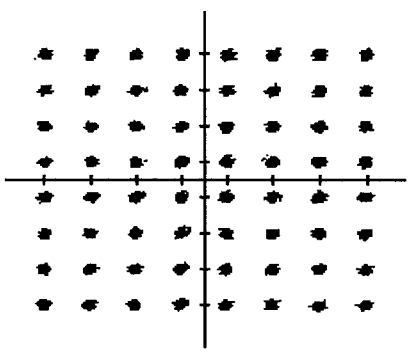
Figure 2C:
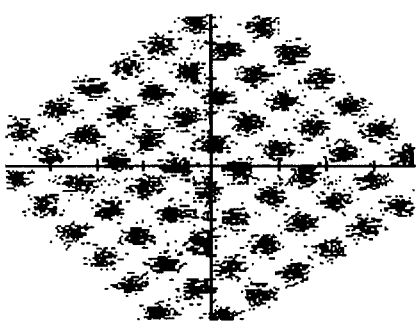
Figure 3:
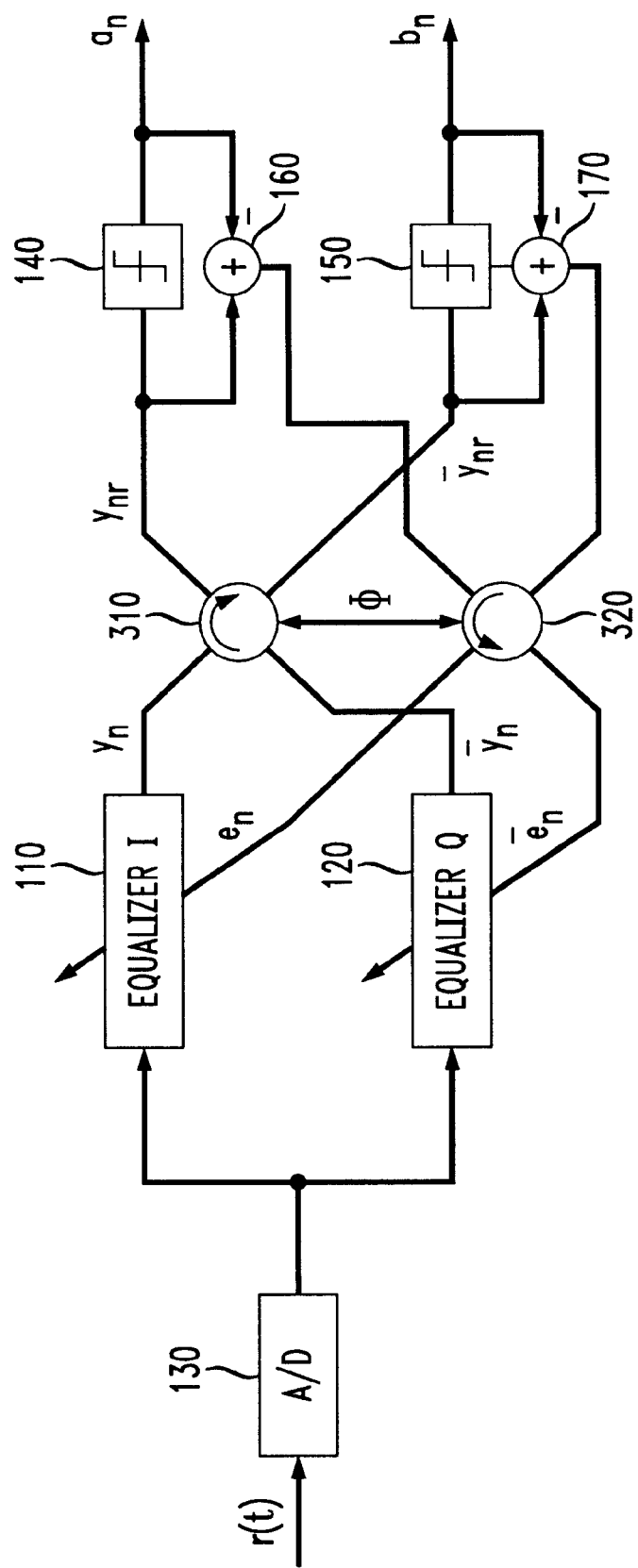
FIG. 3 illustrates a prior art approach to solving the phase error problem addressed by the present invention.
Figure 4A:
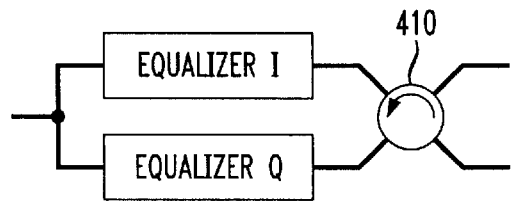
FIGS. 4-A, 4-B, 4-C, 4-D, and 4-E illustrate the equivalent operations of rotation, output phase shift, input phase shift, input interpolation, and tap weight interpolation, respectively, for correcting an arbitrary phase shift of a fractionally-spaced equalizer.
Figure 4B:
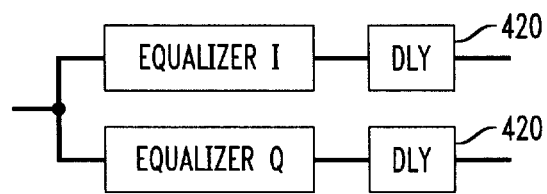
Figure 4C:
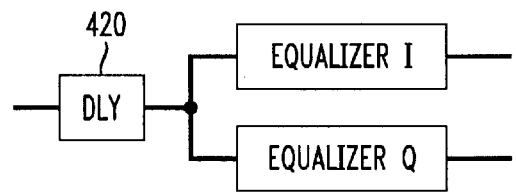
Figure 4D:
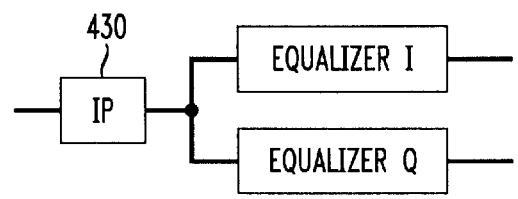
Figure 4E:
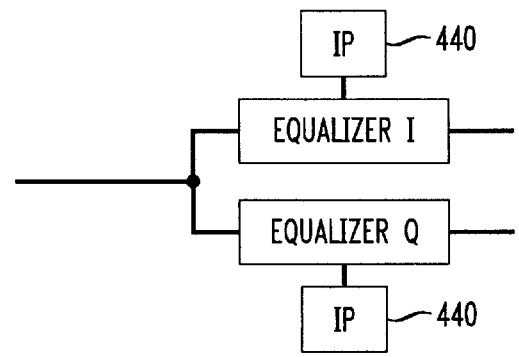

If a training sequence is available, the LMS algorithm can be used to achieve convergence and get a low steady-state mean-square error. The LMS algorithm, however, is rarely successful when applied to blind equalization. The RCA scheme can blindly converge an equalizer, but to achieve low steady-state error, the adaptation should switch to LMS after an initial eye-opening. FIGS. 2-A and 2-B illustrate a 64-point symbol constellation after convergence using RCA and LMS, respectively. As illustrated in FIG. 2-C, the CMA cost function does not contain any information about the phase rotation of the constellation and therefore leaves an arbitrary phase offset after convergence. One approach to solving the problem of phase offset after convergence using CMA, as proposed by Godard ("Self-Recovering Equalization and Carrier Tracking in Two-Dimensional Data Communication Systems," *IEEE T Comm.*, v.28, no. 11, pp. 1867–1875, November 1980), is to include a rotator 310 and a separate cost function controlling the rotation phase, φ, as illustrated in FIG. 3, such that the rotated constellation (composed of $y_{nr}$ and $\overline{y}_{nr}$ in FIG. 3) will be similar to the constellation attainable using RCA as illustrated in FIG. 2-A.

LMS gives better steady-state performance than CMA, so after initial eye-opening, the CMA scheme should be replaced by the LMS adaptation. This requires a derotator 320 in the error path as shown in FIG. 3. The function of the rotator/derotator (310/320) is described by:

$$\begin{bmatrix} y_{nr} \\ \overline{y}_{nr} \end{bmatrix} = \begin{bmatrix} \cos\phi & -\sin\phi \\ \sin\phi & \cos\phi \end{bmatrix} \cdot \begin{bmatrix} y_n \\ \overline{y}_n \end{bmatrix} \quad (5)$$

where an estimate of the phase, φ, can be obtained from methods used in data-directed carrier recovery. A standard technique is a gradient algorithm:

$$\phi_{n+1} = \phi_n - \mu \cdot \overline{\theta}_e \quad (6)$$

$$\overline{\theta}_e = \text{Im}\left(\frac{Y_{nr} \cdot A_n^*}{|A_n|^2}\right)$$

where μ is a small, positive constant, $Y_{nr}=y_{nr}+j\cdot\overline{y}_{nr}$, $A_n=a_n+j\cdot b_n$, $A_n^*$ is the conjugate of $A_n$ and $\overline{\theta}_e$ represents an estimate of the real phase error, $\theta_e$. To eliminate the need for division, the square term may be removed to yield:

$$\overline{\theta}_e = \text{Im}(Y_{nr} \cdot A_n^*). \quad (7)$$

A rotator is strictly not needed in the RCA scheme, but is sometimes used to achieve rapid phase-tracking, where $A_n^*$ is replaced with $-e_n^* = -(Y_{nr} - A_n^*)$ in equation (7), which gives a mathematically equivalent result for small phase errors.

In lab experiments and simulations, it has been observed that RCA sometimes results in ill-convergence such that the in-phase and quadrature-phase equalizers converge to a local minimum. A common local minimum is that both the I and Q equalizers converge to tap weight settings such that both equalizers decode the same 1D symbols, e.g., the Q symbols, which results in a diagonal constellation. Another convergence failure is when the I and Q parts converge to tap weight settings such that the I equalizer decodes symbol $a_n$ while the Q equalizer decodes $b_{n-1}$. Although the CMA scheme may also result in ill-convergence, it is generally much more reliable than RCA; however, the cost of a rotator/derotator and the need for an adaptation algorithm to find φ are not preferred, in light of the much simpler approach disclosed by the present invention.

As those skilled in the art will recognize, the reason for using a rotator is that the phase of the equalizer output is non-zero, resulting in a tilted constellation that may be corrected by adding a rotator 410 after the equalizer as illustrated in FIG. 4-A. Alternatively, the rotator can be replaced by a compensating phase shift, or delay, 420 at the output of the equalizer as illustrated in FIG. 4-B, or at the front of the equalizer as illustrated in FIG. 4-C. In a digital discrete-time implementation, a delay is often implemented as a shift register restricting the delay to an integer number of samples. A non-integer delay, however, can be implemented with an interpolator as illustrated 430 in FIG. 4-D.

Most adaptive equalizers are implemented as FIR filters, which perform a discrete time convolution. In the continuous time case:

$$y(t) = \int r(t-\tau) \cdot c(\tau) d\tau = \int r(\tau) \cdot c(t-\tau) d\tau. \quad (8)$$

Calculating y at t+Δ gives:

$$y(t+\Delta) = \int r(t+\Delta-\tau) \cdot c(\tau) d\tau = \int r(\tau) \cdot c(t+\Delta-\tau) d\tau, \quad (9)$$

from which it is recognized that moving the delay from the output to the input of the equalizer is equivalent to replacing the output delay with a "delay" of the weights, i.e., replacing $c_0$ with $c_1$, $c_1$ with $c_2$, and so on. Thus, the present invention introduces the broad concept of modifying the filter coefficients of an equalizer, rather than using a rotator/derotator, to correct for the phase error of an equalizer; the process of modifying the filter coefficients of an equalizer being modeled in FIG. 4-E as an "interpolator" 440. In one embodiment of the present invention, a phase-correcting CMA ("PCMA") training method can be implemented as follows:

1) The standard CMA update scheme of equations (4) is applied to the hardware configuration illustrated in FIG. 1.
2) The phase error, $\theta_e$, is estimated, either using the equations provided hereinabove or as hereinafter disclosed.
3) Instead of performing the phase correction with a rotator, the filter coefficients of the equalizers are adjusted to minimize the phase error, $\theta_e$. This is done by interpolating the weights as:
    if $\overline{\theta}_e > 0$:

$$c_{n+1}(k) = (1-\mu\overline{\theta}_e)c_n(k) + \mu\overline{\theta}_e \cdot c_n(k-1)$$

else $$c_{n+1}(k) = (1+\mu\overline{\theta}_e)c_n(k) - \mu\overline{\theta}_e \cdot c_n(k+1). \quad (10)$$

where μ is the stepsize, similar to α in equations (1), which may be chosen through simulation methods known to those skilled in the art.

As those skilled in the art will understand, the CMA equalization algorithm for inverting the channel contains no phase feedback and the phase-correcting algorithm only changes the phase-shifting characteristic of the equalizer filters. Therefore, the algorithms in equations (4) and (10) are completely separated and will not disturb each other or generate local minima.

It is important to note that the phase-shifting in equation (10) is always done for both the in-phase and the quadrature-phase equalizer such that their phase relationship always remains at 90° (assuming a 90° initial phase difference). This guarantees that a diagonal constellation and other ill-convergence situations are avoided.

The phase error estimate provided by equations (6) and (7), and the update algorithm in equation (10), indicate that the stochastic gradient algorithm can be replaced by a block processing scheme. Instead of adapting all weights for each estimated $\theta_e$ (symbol rate update), an improved phase error estimate may be obtained by averaging $\theta_e$ during a block of symbols and then update the weights once, thereby significantly reducing the complexity of the algorithm. Additionally, as shown hereinafter, the implementation of equation (10) can use the same hardware as the algorithms in equations (4).

Figure 5:
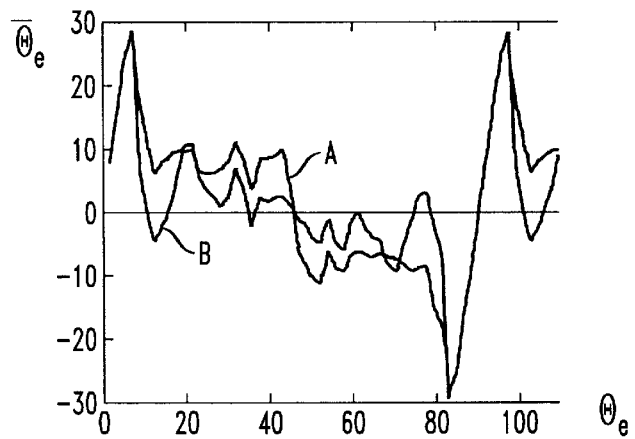
FIG. 5 illustrates plots of estimated versus real phase errors for different embodiments of the present invention.

As those skilled in the art will recognize, the division in equation (6) is not convenient in a VLSI or DSP implementation. Removing the division, however, may cause problems for communication schemes involving both phase and amplitude modulation. Plots A and B in FIG. 5 illustrate the phase estimates in equations (6) and (7), respectively, for a 64-point constellation. These graphs show the average phase estimate assuming a uniform distribution of symbols in the constellation. The cost function in equation (6) has a nearly linear characteristic around $\theta_e=20°$ and $\theta_e=90°$. Even though the function is not linear for large phase errors, it still has the correct sign so that a gradient algorithm will work properly. Furthermore, the null at 45° is unstable with high gain, so hang-up is not likely. A simplified scheme ignoring the division, e.g., using equation (7), gives a cost function with several stable nulls as illustrated in FIG. 5-B, and these nulls give undesired local minima causing improper phase rotation.

Figure 6:
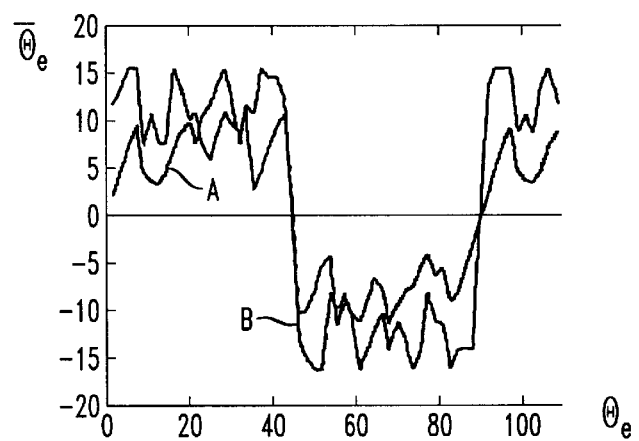
FIG. 6 illustrates plots of estimated versus real phase errors for different embodiments of the present invention.
Figure 7:
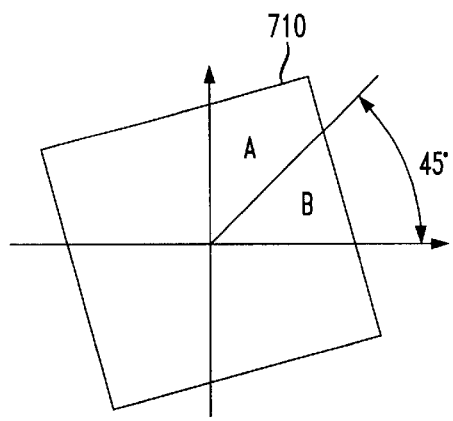
FIG. 7 illustrates a simplified method for estimating the phase error of a symbol constellation.
Figure 8A:
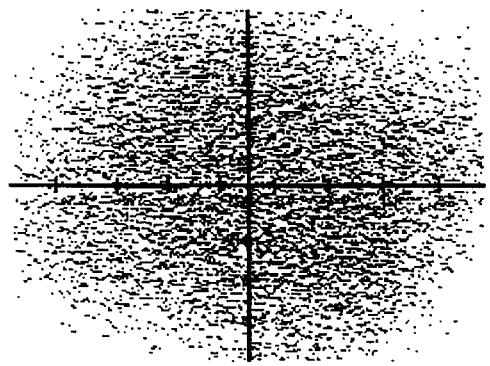
FIG. 8 illustrates the changing shape of a symbol constellation during convergence using the principles of the present invention.
Figure 8B:
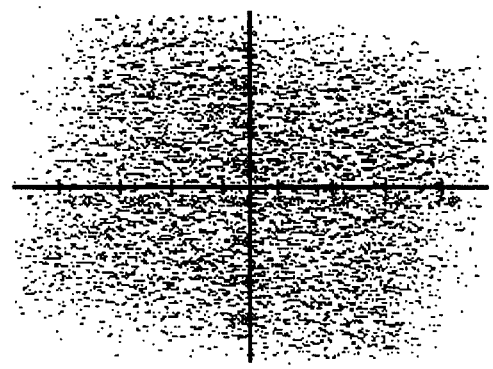
Figure 8C:
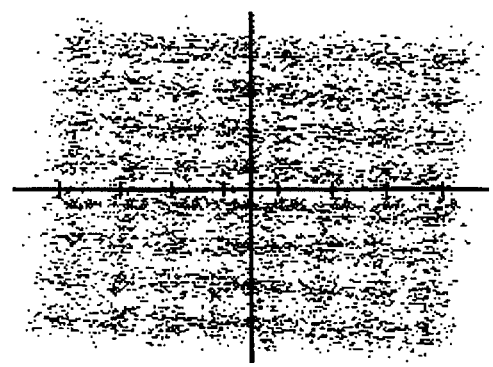
Figure 8D:
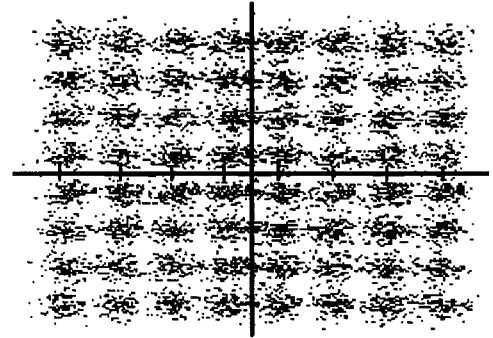

Plot A in FIG. 6 illustrates the phase estimate for equation (7) when $A_n^*$ is replace with the output of a 4-point slicer similar to the RCA scheme. This embodiment eliminates the need for division, but requires an additional slicer. A simpler embodiment employs a scheme based on the trigonometry of a rotated square; FIG. 7 represents a rotated constellation with a square where the first quadrant has been divided into two areas, A and B. Assuming that the received symbols are equally distributed across this square, an estimate of the phase error is:

$$\bar{\theta}_e = \text{area}(A) - \text{area}(B). \tag{11}$$

An average value of this function is illustrated by plot B in FIG. 6. The implementation of this scheme can be done by simply increasing $\phi$ in equation (6) when $y_n > \bar{y}_n$ in FIG. 1 and decreasing $\phi$ when $y_n < \bar{y}_n$, which is valid in the first quadrant; those skilled in the art will recognize that similar relationships can be derived for use in the other quadrants. The simple estimate in equation (11) can be implemented without a multiplier and slicer; comparators may be used to decide in which quadrant a symbol was received and whether $Y_n > \bar{y}_n$.

A modem with a data rate of the order tens kb/s can be built with a general purpose DSP clocked at a few tens MHZ, in which case the additional processing required by the phase-correcting algorithm disclosed by the present invention is negligible when implementing a block processing scheme as described hereinabove. The main burden is to continuously estimate $\theta_e$, which is considerably easier than calculating $e_n$ and $\bar{e}_n$ in equations (4) and updating all weights (i.e., filter coefficients) according to equations (1).

At high bit rates, special purpose hardware is required for both the evaluation of the equalizers and the updating of the weights. Error estimation can still be done in a general purpose processor if desired. In one embodiment, in place of or in combination with equations (10), the interpolation of the filter coefficients (i.e. tap weights) may be approximated using the equations:

if $\bar{\theta}_e > 0$:

$$c_{n+1}(k) = c_n(k) = \mu \bar{\theta}_e \cdot c_n(k-1)$$

else $$c_{n+1}(k) = c_n(k) - \mu \bar{\theta}_e \cdot c_n(k+1), \tag{12}$$

which are very similar to equations (1). In this case, the phase correction will interfer with the CMA updating, but the disturbance is negligible. The only structural difference between equations (1) and equations (12) is that $r_n$, is replaced by $c_n(k-1)$, or $c_n(k+1)$, which, as those skilled in the art will recognize, requires an additional multiplexer and connections between neighboring update units.

The PCMA scheme was simulated with a 64-point constellation transferring 155 Mb/s over an Unshielded Twisted Pair, category 3 cable; the shape of the constellation as the equalizer converged is illustrated, in sequence of time, in FIGS. 8-A, 8-B, 8-C, and 8-D. The transition to LMS is straightforward, since the phase correcting algorithm guarantees that the constellation will not be tilted after convergence, as illustrated in FIG. 8-D. For the simulation illustrated, the phase estimate in equation (11) was accumulated during 400 symbols before updating the equalizer coefficients according to equations (12).

Figure 9:
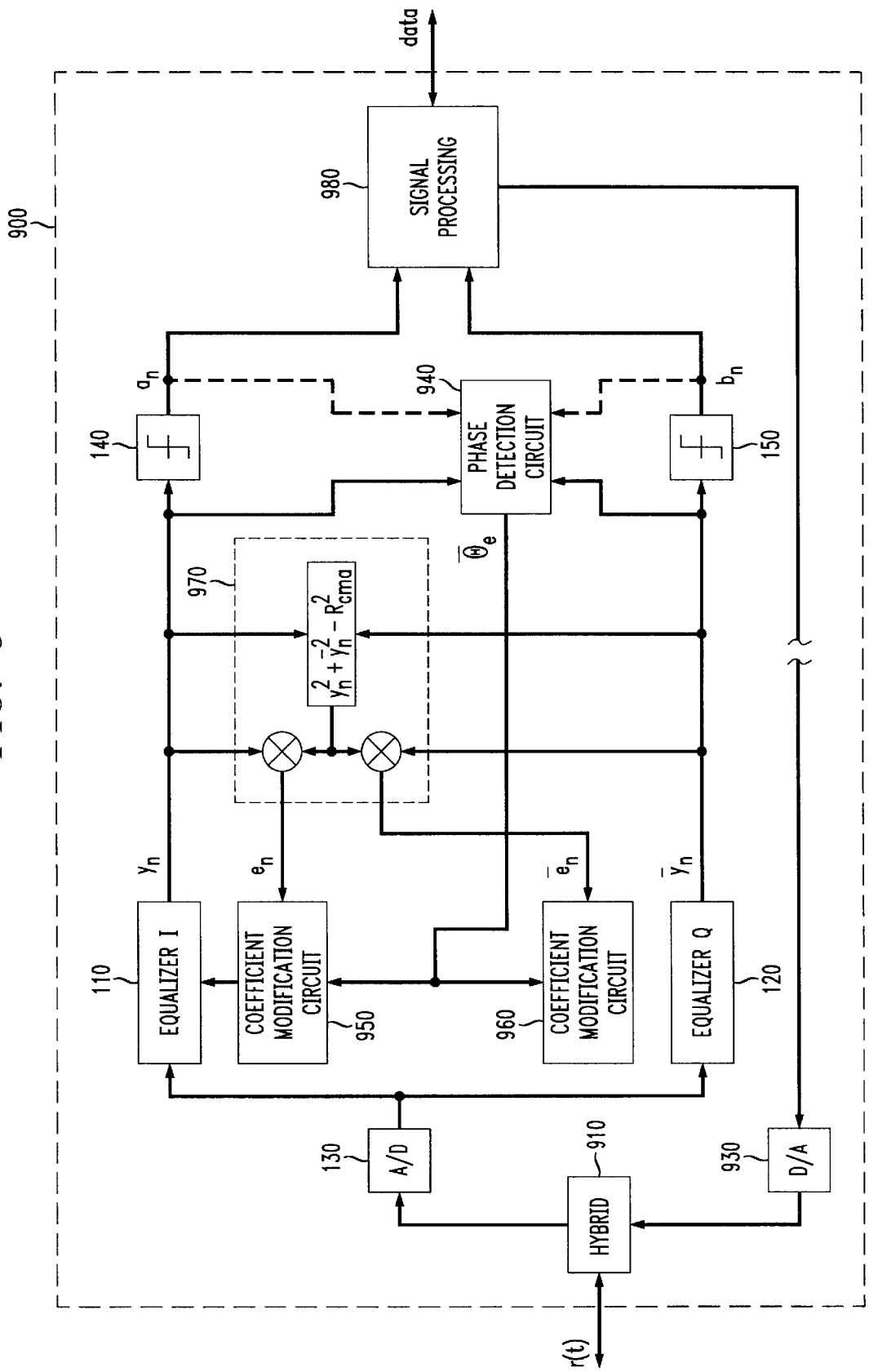
FIG. 9 illustrates a functional schematic for an exemplary modulator/demodulator employing the principles of the present invention.

Turning now to FIG. 9, illustrated is an exemplary modulator/demodulator ("modem") 900 that employs the principles of the present invention; the elements of FIG. 9 introduced previously with respect to FIG. 1 are described hereinabove. The modem 900 includes a signal interface 910 that allows the MODEM to be coupled to an analog transmission medium. As those skilled in the art recognize, a "hybrid" is conventionally used to couple a device to the public switched telephone network ("PSTN"), whereby the device can simultaneously send and receive information over the analog transmission medium; i.e., "full-duplex" operation; the principles of the present invention, however, are not limited to the use of a hybrid as a signal interface. Furthermore, the present invention is not limited to use with the PSTN, but may also be employed with other transmission media, including coaxial (e.g., public cable) systems.

The exemplary modem 900 further includes circuitry for training the equalizers 110, 120 ("training circuitry"), including a phase detection circuit 940 having inputs $y_n$ and $\bar{y}_n$, which are the intermediate symbols generated by equalizers 110, 120. In one embodiment, the phase detection circuit also receives as inputs the resulting symbols $a_n$ and $h_b$, which are the symbols present at the output of slicers 140, 150, which are necessary to calculate an estimate of the phase error, $\bar{\theta}_e$, using equations (6) or (7). To determine the estimated phase error using the method described with reference to FIG. 7, however, the inputs $a_n$ and $b_n$, are not necessary, as described hereinabove with reference to equation (11). The output of the phase detection circuit is the estimated phase error, $\bar{\theta}_e$.

The training circuitry further includes coefficient modification circuits 950, 960 for the equalizers 110, 120, respectively; those skilled in the art will recognize, however, that although coefficient modification circuits 950, 960 are illustrated as functionally distinct, the functions of each may be integrated into a common coefficient modification circuit or, alternatively, the coefficient modification circuits may be integral with the equalizers 110, 120. Furthermore, all or a portion of the circuits illustrated in FIG. 9 may be integrated in hardware, or their functions may be performed by a combination of software and hardware, such as by using a digital signal processor ("DSP"); the claims of the patent intended to cover all such embodiments. The coefficient modification circuits 950, 960 selectively modify the filter coefficients of the equalizers 110, 120 as a function of the estimated phase error, $\overline{\theta}_e$, to cause the intermediate symbols to converge toward the symbols in a predetermined constellation of symbols as the phase error approaches zero. When the phase error is substantially equal to zero, the intermediate symbols are substantially equal to corresponding symbols in the predetermined constellation of symbols; i.e., the difference between the intermediate symbols and the resulting symbols is minimized.

In the embodiment illustrated, the exemplary modem 900 further includes a symbol error circuit 970 that employs the function of a conventional CMA training algorithm to produce a symbol error signals, $e_n$ and $\overline{e}_n$, that are a function of the intermediate symbols as described hereinabove. Thus, the coefficient modification circuits 950, 960 further modify the filter coefficients of the equalizers 110, 120 as a function of both the estimated phase error and the symbol error. Those skilled in the art will readily perceive of other symbol error circuits, employing the functions of other training algorithms, that may be used with the phase detection and coefficient modification circuits disclosed by the present invention; the claims intended to cover such other embodiments.

The exemplary modem 900 further includes signal processing circuitry 980 and a digital-to-analog converter ("DAC") 930. The signal processing circuitry 980 is suitably operative, using a predetermined constellation of symbols, to correlate the resulting symbols $a_n$ and $b_n$, to symbols in the predetermined constellation, whereby the data represented by the symbols is decoded and made available to a system (not shown) coupled to the modem. The signal processing circuitry 980 is also operative to receive data from the attached system for transmission by the modem 900 to remote devices coupled to the analog transmission medium. The digital data, which may be converted to symbols, are converted by DAC 930 to an analog signal, which is coupled by hybrid 910 to the analog transmission medium. Those skilled in the art are familiar with such signal processing circuits, such as DSPs or general purpose computers; the principles of the present invention are not limited to a specific hardware or software implementation of providing such signal processing functions.

The foregoing has described preferred and alternative features of the present invention that form the subject of the following claims. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

What is claimed is:

1. A system for training a plurality of equalizers to recognize a plurality of symbols in a received signal, each of said plurality of equalizers deriving intermediate symbols from said received signal as a function of at least one filter coefficient, said system comprising:

a phase detection circuit that determines a phase error between at least one of said intermediate symbols and at least one symbol in a predetermined constellation of symbols; and a coefficient modification circuit that modifies said at least one filter coefficient by interpolating weights associated therewith as a function of said phase error to cause said at least one intermediate symbol to converge toward said at least one symbol in said predetermined constellation of symbols as said phase error approaches zero, said intermediate symbols substantially equal to said predetermined constellation of symbols when said phase error is equal to zero.

2. The system as recited in claim 1 wherein said phase detection circuit averages the phase error of a plurality of intermediate symbols to determine said phase error, said plurality of intermediate symbols converging to a like plurality of symbols in said predetermined constellation of symbols as said phase error approaches zero.

3. The system as recited in claim 1 wherein said phase detection circuit determines said phase error by calculating a difference between relative sizes of first and second portions of a total region occupied by all of said intermediate symbols, said relative sizes of said first and second portions being equal when said phase error is equal to zero.

4. The system as recited in claim 1 wherein said plurality of equalizers comprises an in-phase equalizer and a quadrature-phase equalizer.

5. The system as recited in claim 4 wherein said received signal is modulated using a two-dimensional modulation scheme.

6. The system as recited in claim 5 wherein said two-dimensional modulation scheme is Quadrature Amplitude Modulation (QAM).

7. The system as recited in claim 1 wherein said predetermined constellation of symbols comprises 64 symbols.

8. The system as recited in claim 1 wherein said system further comprises a symbol error circuit that uses a Constant Modulus Algorithm (CMA) to generate a symbol error signal as a function of said at least one of said intermediate symbols, said coefficient modification circuit further modifying said at least one filter coefficient as a function of said symbol error signal.

9. The system as recited in claim 1 wherein said phase detection circuit and said coefficient modification circuit are contained within a digital signal processor (DSP).

10. A method for training a plurality of equalizers to recognize a plurality of symbols in a received signal, each of said plurality of equalizers deriving intermediate symbols from said received signal as a function of at least one filter coefficient, said method comprising the steps of:

estimating a phase error between at least one of said intermediate symbols and at least one symbol in a predetermined constellation of symbols; and modifying said at least one filter coefficient by interpolating weights associated therewith as a function of said phase error to cause said at least one intermediate symbol to converge toward said at least one symbol in said predetermined constellation of symbols as said phase error approaches zero, said intermediate symbols substantially equal to said predetermined constellation of symbols when said phase error is equal to zero.

11. The method as recited in claim 10 wherein said step of estimating a phase error comprises the step of averaging the phase error of a plurality of intermediate symbols to determine said phase error, said plurality of intermediate symbols converging to a like plurality of symbols in said predetermined constellation of symbols as said phase error approaches zero.

12. The method as recited in claim 10 wherein said step of estimating a phase error comprises the step of calculating a difference between the relative sizes of first and second portions of a total region occupied by all of said intermediate symbols, said relative sizes of said first and second portions being equal when said phase error is equal to zero.

13. The method as recited in claim 10 wherein said plurality of equalizers comprises an in-phase equalizer and a quadrature-phase equalizer.

14. The method as recited in claim 13 wherein said received signal is modulated using a two-dimensional modulation scheme.

15. The method as recited in claim 14 wherein said two-dimensional modulation scheme is Quadrature Amplitude Modulation (QAM).

16. The method as recited in claim 10 wherein said predetermined constellation of symbols comprises 64 symbols.

17. The method as recited in claim 10 wherein said method further comprises the step of generating a symbol error signal using a Constant Modulus Algorithm (CMA), said symbol error signal being a function of said at least one of said intermediate symbols, and wherein said step of modifying further includes the step of modifying said at least one filter coefficient as a function of said symbol error signal.

18. The method as recited in claim 10 wherein said steps of estimating a phase error and modifying said at least one filter coefficient as a function of said phase error are executed within a digital signal processor (DSP).

19. A modulator/demodulator (MODEM) for communicating digital data through an analog transmission medium, said MODEM comprising:
a signal interface that allows said MODEM to be coupled to said analog transmission medium;
a plurality of equalizers; and
training circuitry that trains said plurality of equalizers to recognize a plurality of symbols in a received signal, each of said plurality of equalizers deriving intermediate symbols from said received signal as a function of at least one filter coefficient, said training circuitry including:
a phase detection circuit that determines a phase error between at least one of said intermediate symbols and at least one symbol in a predetermined constellation of symbols; and
a coefficient modification circuit that modifies said at least one filter coefficient by interpolating weights associated therewith as a function of said phase error to cause said at least one intermediate symbol to converge toward said at least one symbol in said predetermined constellation of symbols as said phase error approaches zero, said intermediate symbols substantially equal to said predetermined constellation of symbols when said phase error is equal to zero.

20. The MODEM as recited in claim 19 wherein said phase detection circuit averages the phase error of a plurality of intermediate symbols to determine said phase error, said plurality of intermediate symbols converging to a like plurality of symbols in said predetermined constellation of symbols as said phase error approaches zero.

21. The MODEM as recited in claim 19 wherein said phase detection circuit determines said phase error by calculating a difference between the relative sizes of first and second portions of a total region occupied by all of said intermediate symbols, said relative sizes of said first and second portions being equal when said phase error is equal to zero.

22. The MODEM as recited in claim 19 wherein said plurality of equalizers comprises an in-phase equalizer and a quadrature-phase equalizer.

23. The MODEM as recited in claim 22 wherein said received signal is modulated using a two-dimensional modulation scheme.

24. The MODEM as recited in claim 23 wherein said two-dimensional modulation scheme is Quadrature Amplitude Modulation (QAM).

25. The MODEM as recited in claim 19 wherein said predetermined constellation of symbols comprises 64 symbols.

26. The MODEM as recited in claim 19 wherein said training circuitry further comprises a symbol error circuit that uses a Constant Modulus Algorithm (CMA) to generate an error signal as a function of said at least one of said intermediate symbols, said coefficient modification circuit further modifying said at least one filter coefficient as a function of said error signal.

27. The MODEM as recited in claim 19 wherein said training circuitry is contained within a digital signal processor (DSP).

28. The MODEM as recited in claim 19 wherein said analog transmission medium comprises a public switched telephone network (PSTN).

29. The MODEM as recited in claim 19 wherein said analog transmission medium comprises a coaxial cable.

* * * * *